United States Patent [19]

Zumstein

[11] 4,328,672

[45] May 11, 1982

[54] BYPASS CONTROL APPARATUS FOR TURBOCHARGED INTERNAL-COMBUSTION ENGINES

[75] Inventor: Bruno Zumstein, Lucerne, Switzerland

[73] Assignee: BBC Brown, Boveri & Company Limited, Baden, Switzerland

[21] Appl. No.: 159,608

[22] Filed: Jun. 16, 1980

[30] Foreign Application Priority Data

Jul. 11, 1979 [CH] Switzerland .................. 6463/79

[51] Int. Cl.³ ............................................. F02B 37/00
[52] U.S. Cl. .................................... 60/606; 137/489; 137/492.5
[58] Field of Search .................. 60/600, 601, 602, 603, 60/606; 137/488, 489, 492, 492.5

[56] References Cited

U.S. PATENT DOCUMENTS

| | | | |
|---|---|---|---|
| 1,346,564 | 7/1920 | Sherbondy | 60/602 |
| 2,024,761 | 12/1935 | Fraser | 137/492.5 X |
| 2,113,943 | 4/1938 | Kimball | 137/492.5 |
| 2,234,777 | 3/1941 | Puffer | 60/602 X |
| 2,684,569 | 7/1954 | Buchi | 60/611 X |
| 2,710,521 | 6/1955 | Nettel | 60/606 X |
| 3,161,207 | 12/1964 | McCarvell et al. | 137/492.5 |

FOREIGN PATENT DOCUMENTS

| | | | |
|---|---|---|---|
| 624301 | 1/1936 | Fed. Rep. of Germany | 60/602 |
| 2284040 | 4/1976 | France | 60/606 |

Primary Examiner—Michael Koczo, Jr.
Attorney, Agent, or Firm—Werner W. Kleeman

[57] ABSTRACT

A bypass control apparatus for turbocharged internal-combustion engines, comprising an actuating cylinder for a bypass valve of the bypass control apparatus, wherein the pressure of a fluid medium or fluid in the actuating cylinder is controlled by fixed throttles and throttles adjustable by the boost air pressure arranged in the fluid supply and discharge pipes or lines.

6 Claims, 3 Drawing Figures

BYPASS CONTROL APPARATUS FOR TURBOCHARGED INTERNAL-COMBUSTION ENGINES

CROSS-REFERENCE TO RELATED CASES

This application is related to my commonly assigned U.S. application Ser. No. 06/159,607, filed June 16, 1980, entitled "BYPASS CONTROL APPARATUS FOR TURBOCHARGED INTERNAL-COMBUSTION ENGINES" and my commonly assigned U.S. application Ser. No. 06/159,606, filed June 16, 1980, entitled "BYPASS CONTROL APPARATUS FOR TURBOCHARGED INTERNAL-COMBUSTION ENGINES".

BACKGROUND OF THE INVENTION

The present invention relates to a new and improved construction of a bypass control apparatus or mechanism for turbocharged internal-combustion engines.

Generally speaking, the bypass control apparatus of the present development is of the type having an opening characteristic which is dependent upon the boost air pressure for the bypass valve of the bypass control apparatus located in a bypass line or pipe which interconnects a point or location of a boost or charging air pipe, located downstream of a compressor, with a point or location of an exhaust gas pipe or line located upstream of the turbine inlet of the turbocharger.

As is well known in this technology, bypass mechanisms can be beneficially used to improve the partial load behavior of turbocharged internal-combustion engines. In such cases, a fraction of the compressed boost air, which is a function of the momentary or instantaneous operating state of the engine, is introduced through a bypass pipe or line to a point of the exhaust gas pipe located upstream of the exhaust gas turbine. With this technique the internal-combustion engine receives more air than in the case of turbocharging without a bypass. For this purpose the bypass mechanism or apparatus possesses a bypass valve which may be controlled by any engine load-dependent parameter which serves as a control magnitude or quantity. The valve lift then is accomplished such that a large quantity of air is transferred during the no-load and lower partial load ranges and with increasing load a progressively decreasing quantity of air is transferred, until the valve completely closes near the full-load point of the engine and the transfer of the bypass air is suppressed.

With heretofore known bypass apparatuses or mechanisms, there is employed, for instance, as the control magnitude or quantity for controlling the bypass air stream or flow, the pressure differential prevailing across the bypass between the compressed boost air and the exhaust gases at the turbine inlet as the control magnitude or quantity for controlling the bypass air stream.

The utilization of such control magnitude or quantity is associated with the advantage that there are not required any additional signal generators for controlling the actuation elements for the bypass valve. On the other hand, the correct dimensioning the pneumatic elements requires an extensive experimental effort, because of the difficulty of previously calculating the operating behaviour of the combination of exhaust gas turbine and compressor.

SUMMARY OF THE INVENTION

Therefore, with the foregoing in mind it is a primary object of the present invention to provide a new and improved construction of a bypass control apparatus for turbocharged internal-combustion engines which is not associated with the aforementioned drawbacks and limitations of the prior art proposals.

Another and more specific object of the invention aims at providing a new and improved construction of bypass control apparatus for turbocharged internal-combustion engines wherein only the boost pressure is employed as the control magnitude or quantity, thereby realizing a considerable simplification of the bypass control apparatus.

Yet a further significant object of the present invention aims at providing a new and improved construction of bypass control apparatus for turbocharged internal-combustion engines, which is relatively simple in construction and design, quite economical to manufacture, extremely reliable in operation, not readily subject to breakdown or malfunction, and requires a minimum of maintenance and servicing.

Now in order to implement these and still further objects of the invention, which will become more readily apparent as the description proceeds, the bypass control apparatus for turbocharged internal-combustion engines as contemplated by the present invention, is manifested by the features that there is provided a fluid circuit comprising a source for a pressurized fluid or fluid medium. An actuation or actuating cylinder serves for the actuation of the bypass valve, and such actuating cylinder is loaded or impinged by the pressurized fluid medium. A throttle valve having a fixedly adjustable throttle cross-section or through-flow is arranged in a supply pipe or line of the fluid circuit between the fluid source and the actuating cylinder. There is also provided a control throttle combination located downstream or behind the actuating cylinder in the flow direction of the fluid medium. This control throttle combination is loaded by resilient elements, typically springs, and possesses two closure elements, defining first and second closure elements, which are actuatable by boost air pressure, by the action of pistons, by means of a control air line or pipe which branches-off from the boost air line or pipe. The springs, when in their rest state or condition, maintain the first closure element open and the second closure element closed.

BRIEF DESCRIPTION OF THE DRAWINGS

The invention will be better understood and objects other than those set forth above, will become apparent when consideration is given to the following detailed description thereof. Such description makes references to the annexed drawings wherein.

DETAILED DESCRIPTION OF THE PREFERRED EMBODIMENTS

Figure 1:
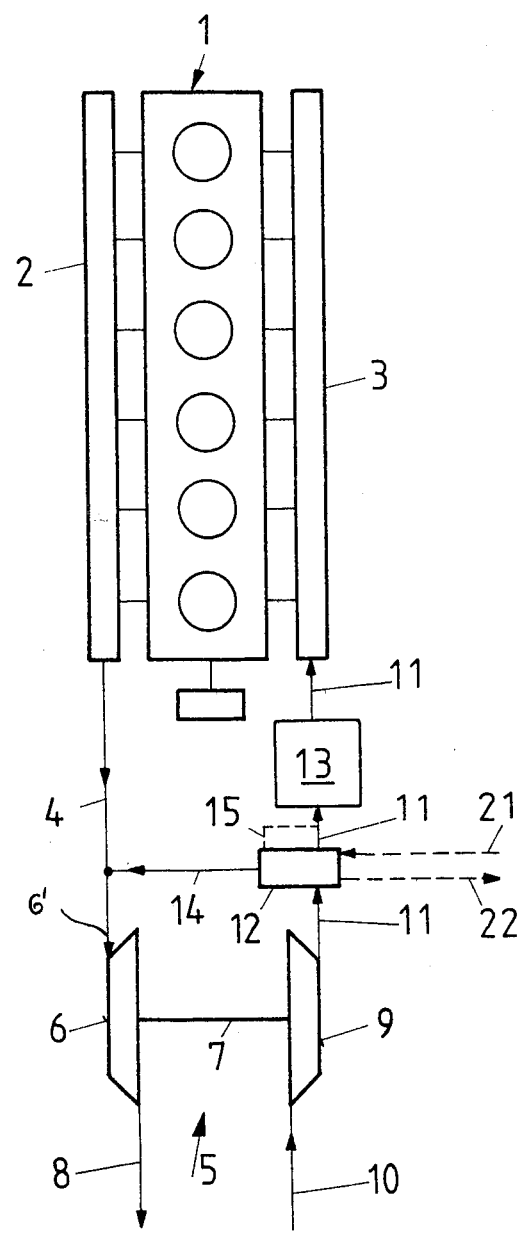
FIG. 1 schematically illustrates a turbocharged engine provided with a bypass control apparatus according to the invention.

Describing now the drawings, in FIG. 1 there is schematically illustrated a six-cylinder turbocharged engine 1 which contains an exhaust gas manifold 2 and a boost air container or receiver 3. The exhaust gases pass through an exhaust gas pipe or conduit 4 into an exhaust gas turbine 6 of a turbocharger 5, leaving the latter through an exhaust pipe or conduit 8. The exhaust gas turbine 6 is connected by means of a shaft 7 with a compressor 9, which sucks-in air through an intake pipe or line 10 and forces such sucked-in air, in a compressed state, by means of a boost air pipe or line 11 through a bypass control housing 12 into a boost air cooler 13 and further into the boost air container or receiver 3, from which the cylinders of the internal-combustion engine 1 receive their combustion air. A bypass pipe or line 14 connects the bypass control housing 12 to a point of the exhaust gas pipe 4 which is located upstream of the inlet 6' into the turbine 6. By means of a control air line or pipe 15 there is branched-off of the boost air line or pipe 11 boost air which is used to control a bypass valve 17.

Figure 2:
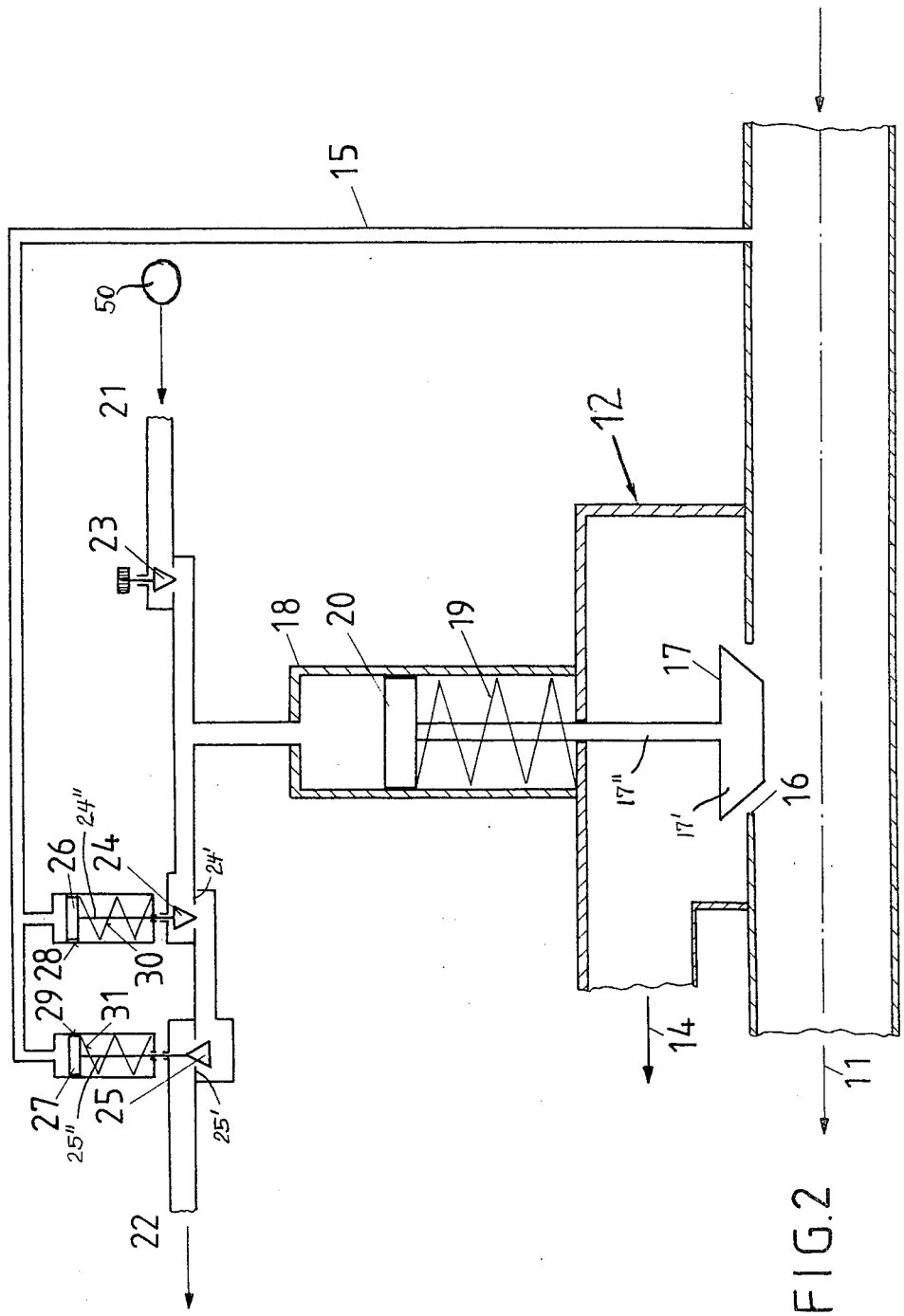
FIG. 2 illustrates details of the bypass control apparatus according to the invention used in the arrangement of FIG. 1.

FIG. 2 schematically illustrates details of one possible embodiment of bypass control apparatus or mechanism according to the invention. As will be seen, the bypass control housing 12 communicates by means of a valve orifice or opening 16 with the boost air pipe or line 11 and by means of the bypass line or pipe 14 with the exhaust gas pipe 4. The bypass valve 17 cooperating with the valve orifice or opening 16 is constructed as a plate or disk valve 17' which is provided at the upper end of its valve stem 17" with a piston 20 slidably arranged within an actuating or actuation cylinder 18. The piston 20 is loaded by a compression or pressure spring 19 or equivalent structure.

The bypass control apparatus employs as the work medium for the control operation a fluid or fluid medium which is under approximately constant pressure, such as, for instance, air delivered from a pressurized air system, oil from a hydraulic unit or also from the lubricating oil system of the internal-combustion engine, as has merely been schematically indicated in FIG. 2, by reference character 50. The supply line or pipe and the discharge line or pipe of the work or working medium have been conveniently designated by reference characters 21 and 22, respectively, in FIGS. 1 and 2.

At the section of the work medium pipe or line of the fluid circuit 21, 22 between the supply pipe 21 and the discharge pipe 22 there is provided a throttle valve 23 which is fixedly adjustable for a specific internal-combustion engine. This throttle valve 23 limits the maximum mass flow of the work medium through the valve, and thus, maintains an essentially constant pressure in the supply pipe or line 21. Further, at such section of the fluid circuit 21, 22 there are provided two control throttle valves 24 and 25 which control, as a function of the boost pressure, the flow cross-section through the valve seats 24' and 25', respectively, and hence control the work medium pressure between these two throttle valves 24 and 25 and the fixed throttle valve 23, and thus the work medium pressure above the piston 20 of the actuating cylinder 18. By appropriate adjustment of the throttle valve 25, it is possible to adjust the pressure in the actuating cylinder 18 needed for a given internal-combustion engine, and thus, the positioning or control forces for the actuation of the bypass valve 17.

The stems 24" and 25" of both control throttle valves 24, 25 are rigidly connected with the related pistons 26 and 27, respectively. These pistons 26 and 27 are slidably dispositioned in the related control cylinders 28 and 29 and are urged upwards in the rest condition by compression or pressure springs 30 and 31, respectively, so that the first control throttle valve 24 is then completely open and the second control throttle valve 25 is completely closed. The spring 30 of the first control throttle valve 24 is stiffer than the spring 31 of the second control throttle valve 25.

The control air pipe or line 15 branching from the boost air pipe or line 11 issues into the two control cylinders 28 and 29. Under no-load or idling conditions and at the attendant low boost air pressure, the control throttle valve 25 is initially closed and the control throttle valve 24 completely open. Due to the closed throttle valve 25, a pressure forms above the piston 20 of the bypass valve 17, this pressure retaining such bypass valve 17 in its closed state. Hence, recirculation of the exhaust gases is prevented during this phase. With increasing load, and thus, increasing boost air pressure, the latter first opens the control throttle valve 25, because of the softer spring 31 and the equal-sized loaded piston surfaces or faces of the pistons 26 and 27, whereby the pressure above the piston 20 of the bypass valve 17 diminishes and the bypass is rapidly fully opened. With further increasing boost air pressure, the force acting upon the piston 26 also overcomes the resistance of the more rigid or stiffer spring 30, so that the control throttle valve 24 is moved in the closing direction and is fully closed as the full-load state is approached. The bypass flow or stream evolves correspondingly from its maximum value after the opening of the control throttle valve 25, continuously decreasing until the complete closure of the control throttle valve 24.

The magnitude and course of the bypass flow or stream can be influenced in the desired manner by appropriate adjustment of the fixed throttle valve 23 and corresponding dimensioning of the valve-lift curves of the two control throttle valves 24 and 25, principally by selecting the spring stiffnesses and characteristics, valve throughflow cross-sections and piston surfaces. Instead of providing different stiffnesses or characteristics for the two springs 30 and 31, the piston surfaces may also be designed so as to have different areas with the same spring characteristics.

Also a combination of different piston surface areas with springs of different characteristics or stiffness, or with springs connected in series adapted to the desired valve-lift, whereby there is obtained a spring characteristic having a knee or kinked portion, are also possible. Thus, for instance, the compression springs 30 and 31 of the control throttle valves 24 and 25 may have the same spring characteristics, but the piston surface of the piston 26 of the first control throttle valve 24 is smaller than that of the piston 27 of the second throttle valve 25.

Figure 3:
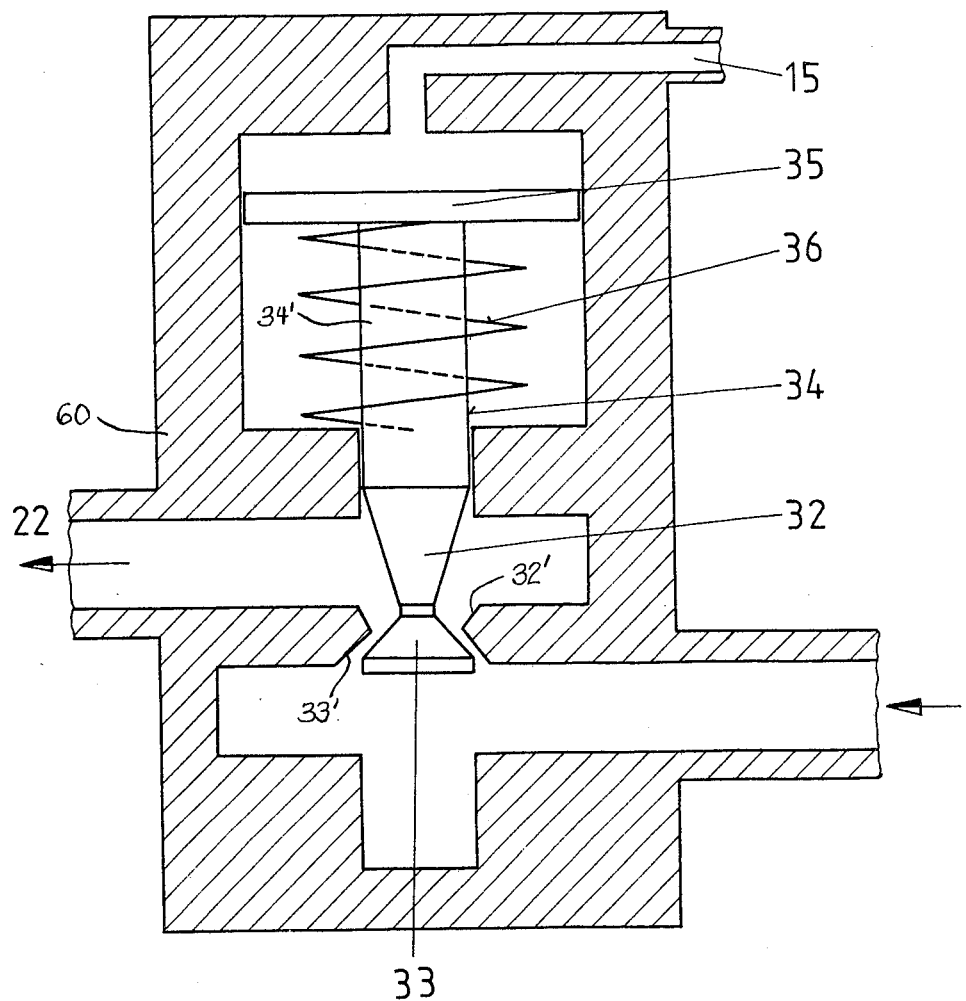
FIG. 3 schematically illustrates in sectional enlarged view a further exemplary embodiment of the invention.

Instead of using the control throttle combination comprising the two valves 24 and 26, as disclosed in the embodiment according to FIG. 2, there may be employed a space-saving construction as illustrated in the variant embodiment of FIG. 3. It combines two valve cones 32 and 33 into a throttle valve element 34, the stem 34' of which is rigidly connected to a piston 35. The function of this combination is the same as that disclosed with respect to the embodiment of FIG. 2: at low boost pressure the valve cone 33 blocks the mass flow of the fluid serving as the working or work medium, the bypass valve is closed in order to prevent any exhaust gas recirculation. With increasing load, the valve cone 33 is lifted from its valve seat 33', against the force of the compression or pressure spring 36, and the bypass valve 17 is opened. With further increasing load the upper valve cone 32 constricts the throughflow or passage cross-section progressively until there has been accomplished complete closure before full-load, and correspondingly, the bypass flow or stream is also continuously throttled and ultimately totally interrupted.

By appropriate configuration and/or dimensioning of the valve cones 32 and 33, their seat surfaces or valve seats 33' and 32' in the housing 60, of the piston 35 and of the compression spring 36, any desired valve-lift curve can be realized as in the embodiment described hereinbefore. As previously explained, the compression spring 36 can be conceptually considered to comprise series connected springs in order to obtain a kinked spring characteristic corresponding to the desired valve-lift curve.

While there are shown and described present preferred embodiments of the invention, it is to be distinctly understood that the invention is not limited thereto, but may be otherwise variously embodied and practised within the scope of the following claims. ACCORDINGLY,

What I claim is:

1. In a bypass control apparatus for turbocharged internal-combustion engines having an opening characteristic dependent upon the boost pressure and for a bypass valve arranged in a bypass line which connects a point of a boost air pipe located downstream of a compressor to a point of an exhaust gas pipe located upstream of the turbine inlet of the turbocharger, the improvement which comprises:

a fluid circuit containing a fluid source for a pressurized fluid medium;
an actuating cylinder for actuating the bypass valve;
said actuating cylinder being loadable by the pressurized fluid medium;
said fluid circuit comprising a supply line;
a throttle valve having fixedly adjustable throttle cross-section arranged in said supply line between the fluid source and the actuating cylinder;
control throttle means arranged downstream of the actuating cylinder in the flow direction of the fluid medium;
resilient means for loading said control throttle means;
said control throttle means comprising two closure elements defining first and second closure elements;
a control air line branching off said boost air pipe;
piston means for actuating said two closure elements by boost air pressure; and
said resilient means in a rest condition maintaining the first closure element open and the second closure element closed.

2. The improvement as defined in claim 1, wherein:
said two closure elements of said control throttle means comprise two control throttle valves;
said resilient means comprising a respective compression spring for loading each related throttle valve;
the compression spring of the first control throttle valve being more rigid than the compression spring of the second control throttle valve; and
said two pistons having pressure-loaded piston surfaces of the same area.

3. The improvement as defined in claim 1, wherein:
said two closure elements of said control throttle means comprise two control throttle valves;
said resilient means comprising respective compression springs for loading each of said two control throttle valves;
said two compression springs exhibiting the same spring characteristic;
said piston means having pressure-loaded piston surfaces;
said pressure-loaded piston surface of the piston means of the first control throttle valve being smaller in area than the piston surface of the piston means of the second control throttle valve.

4. The improvement as defined in claim 1, wherein:
said control throttle means comprises a throttle valve element provided with two substantially coaxial valve cones; and
said piston means comprises a piston member provided for said throttle valve element.

5. The improvement as defined in claim 4, wherein:
said resilient means comprises compression spring means acting upon said throttle valve element.

6. The improvement as defined in claim 5, wherein:
said compression spring means comprise springs connected in series, in order to obtain a kinked spring characteristic corresponding to a desired valve-lift curve.

* * * * *